Patented Mar. 14, 1950

2,500,256

UNITED STATES PATENT OFFICE 2,500,256

PRODUCTION OF NITRILES

John E. Mahan, Bartlesville, Okla., assignor to Phillips Petroleum Company, a corporation of Delaware No Drawing. Application December 11, 1944, Serial No. 567,779

11 Claims. (Cl. 260—465.1)

This invention relates to a method for the production of an aliphatic nitrile. The process of this invention is particularly applicable to the production of isobutyronitrile.

In accordance with my invention isobutyronitrile is produced from isobutylene oxide and ammonia in accordance with the reaction represented by the following equation:

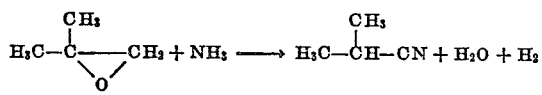

The procedure for the carrying out of this reaction is more fully disclosed hereinafter.

Prior art methods of producing isobutyronitrile are largely confined to classical procedures involving expensive intermediates and low yields. More recently more efficient catalytic methods have been recommended wherein primary alcohols are converted to nitriles through reaction with ammonia in the presence of copper and silver catalysts. However, primary alcohols are ordinarily available only through fermentation processes and costly multiple-step syntheses. Due to the demand for methacrylonitrile in the synthetic resin and rubber industry, new methods for the production of isobutyronitrile are of considerable economic importance since this compound can be converted to methacrylonitrile through simple dehydrogenation. In connection with the problem of synthesizing isobutyronitrile, I have discovered a new reaction based on the conversion of isobutylene oxide to isobutyronitrile, thereby rendering the overall process independent of primary alcohols since the said oxide is available through suitable chemical treatment of isobutylene derived from petroleum refinery operations.

An object of this invention is to provide a process for the production of an aliphatic nitrile.

Another object is to provide a process for the production of a nitrile from a tertiary olefin oxide and ammonia.

Another object is to provide a catalyst which selectively promotes the production of an aliphatic nitrile from an olefin oxide and ammonia.

Another object is to provide a process which is particularly useful for the production of isobutyronitrile from isobutylene oxide and ammonia.

Still another object of this invention is to provide a process for the interaction of isobutylene oxide and ammonia in the presence of a contact catalyst under conditions such that isobutyronitrile in high yield is selectively produced.

The following specific detailed description illustrates the general procedure employed in the present novel synthesis of isobutyronitrile from isobutylene oxide and ammonia. Vaporized isobutylene oxide admixed with about 3 or more molecular proportions of ammonia is preheated to about 400–600° F. and thence charged to a steel reaction zone preferably filled with a dehydrating-dehydrogenating contact catalyst having a high degree of selectivity toward the dehydration and dehydrogenation reactions involved. The reaction takes place in a temperature range of about 600 to 1000° F. at pressures ranging from subatmospheric to about 100 pounds per square inch gage. Effluent vapor from the reaction zone may be condensed and excess ammonia stripped from the condensate. Basic organic material is removed from the condensate by extraction with dilute acid, after which the crude product is fractionally distilled to recover the isobutyronitrile boiling at about 100 to 103° C.

While the preceding embodiment is specific with respect to the employment of catalysts, it is not to be inferred that the accomplishment of the present synthesis is dependent on the employment of catalysts. However, in order to suppress side reactions and thereby increase the yield of isobutyronitrile, I prefer to employ a catalytic process rather than a non-catalyzed reaction system. In general I have found composite catalysts, comprising a carrier contact material capable of promoting dehydration reactions impregnated with a minor quantity of material capable of promoting dehydrogenation reactions, effective in promoting the formation of isobutyronitrile under less drastic conditions than is required in non-catalytic systems. Activated alumina, magnesia, chromia gel, silica gel, silica-alumina gel and similar materials of natural or synthetic origin as well as certain naturally occurring clays may be employed as the catalyst base. Suitable catalyst components for promotion of the dehydrogenation reaction may include selected metals such as copper, nickel, silver, platinum, cobalt, and the like.

Having now broadly disclosed my novel isobutyronitrile synthesis, the following specific examples are offered by way of further illustration of the present invention.

EXAMPLE I

Isobutyronitrile was prepared by means of the vapor phase reaction of ammonia and isobutylene oxide in the presence of a catalyst comprising activated alumina impregnated with reduced copper. The catalyst was prepared by evaporating to dryness a solution of 134 g.

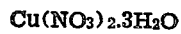

in 250 ml. of water in which was suspended 200 g. of 8–14 mesh Alorco brand activated alumina. The impregnated alumina was then heated at 800–900° F. for 12 hours to convert the copper nitrate to the oxide after which the oxide was reduced to metallic copper in a stream of hydrogen. The final copper-alumina catalyst consisted of 15 per cent copper. The finished catalyst was charged to a tubular catalyst case supported in an electrically heater furnace. The reaction technique was substantially that hereinbefore described. A summary of operating conditions and results is given in Table 1.

Table 1

| | |
|---|---|
| Catalyst volume, ml | 100 |
| Feed rate: | |
|    Isobutylene oxide, mols per hour | 0.33 |
|    Ammonia, mols per hour | 1.00 |
| Reaction temperature, °F | 730–820 |
| Pressure lbs. per sq. in. gage | 0.0 |
| Contact time, seconds | 1.5 |
| Yield of isobutyronitrile, mol per cent on oxide charge | 37 |
| Nitrile boiling range, °C | 100–103 |

EXAMPLE II

Synthesis of isobutyronitrile was effected from ammonia and isobutylene oxide in a non-catalytic system. The reaction procedure was essentially the same as employed in Example I with the exception that 6–10 mesh Pyrex glass chips were used to fill the reaction zone in order to provide adequate heat transfer. The results of this run are presented in Table 2.

Table 2

| | |
|---|---|
| Feed rate: | |
|    Isobutylene oxide, mols per hour | 0.16 |
|    Ammonia, mols per hour | 0.50 |
| Reaction temperature, °F | 850–900 |
| Pressure, lbs. per sq. in. gage | 0.0 |
| Contact time, seconds | 3.0 |
| Isobutyronitrile yield, mol per cent on oxide charge | 3.5 |

In this non-catalyzed reaction extensive decomposition occurred with the formation of tarry and resinous materials.

EXAMPLE III

A catalyst for promoting the conversion of isobutylene oxide and ammonia to isobutyronitrile was prepared by treating a synthetic silica-alumina gel (1.5 per cent alumina and 98.5 per cent silica) with silver nitrate solution in a manner similar to that described in Example I. The nitrate was thermally decomposed to the oxide and elementary silver ultimately formed by reduction in a stream of hydrogen at about 700° F. The nitrile synthesis was then carried out in a manner analogous to that of Example I. The operating conditions and results are given in Table 3.

Table 3

| | |
|---|---|
| Catalyst volume, ml | 100 |
| Feed rate: | |
|    Isobutylene oxide, mols per hour | 0.4 |
|    Ammonia, mols per hour | 1.0 |
| Reaction temperature, °F | 750–800 |
| Contact time, seconds | 1.5 |
| Isobutyronitrile yield, mol per cent on oxide charge | 46 |

I claim:

1. A process for the production of aliphatic nitrile which comprises reacting a tertiary olefin oxide with ammonia in vapor phase at a temperature within the range of 600 to 1000° F. and at a pressure within the range of subatmospheric to about 100 pounds per square inch gage.

2. A process for the production of an isobutyronitrile which comprises reacting isobutylene oxide with ammonia in vapor phase at a temperature within the range of 600 to 1000° F. and at a pressure within the range of subatmospheric to about 100 pounds per square inch gage.

3. A process for the production of isobutyronitrile which comprises reacting isobutylene oxide with ammonia in vapor phase at a temperature within the range of 600 to 1000° F. and at a pressure within the range of subatmospheric to about 100 pounds per square inch gage in the presence of a catalyst comprising alumina impregnated with a minor proportion of metallic copper.

4. A process for the production of an aliphatic nitrile which comprises reacting a tertiary olefin oxide with ammonia in vapor phase at a temperature within the range of 600 to 1000° F. in the presence of a solid contact catalyst comprising a solid carrier contact material selected from the group consisting of activated alumina, magnesia, chromia gel, silica gel and silica-alumina gel impregnated with a minor quantity of a metal selected from the group consisting of copper, nickel, silver, platinum and cobalt.

5. A process as defined in claim 4 wherein said metal is copper.

6. A process as defined in claim 4 wherein said metal is silver.

7. A process for the production of isobutyronitrile which comprises reacting isobutylene oxide with ammonia in vapor phase at a temperature within the range of 600 to 1000° F. in the presence of a catalyst comprising silica-alumina gel impregnated with a minor proportion of metallic silver.

8. A process for the production of isobutyronitrile which comprises admixing isobutylene oxide with at least three molecular proportions of ammonia, and passing said mixture in vapor phase at a temperature within the range of 600 to 1000° F. into contact with a solid contact catalyst comprising alumina impregnated with a minor proportion of metallic copper.

9. A process for the production of isobutyronitrile which comprises admixing isobutylene oxide with about three molecular proportions of ammonia, subjecting the resulting mixture in the vapor phase to a reaction temperature within the range of 850 to 900° F. at atmospheric pressure for a time of about three seconds, and recovering isobutyronitrile so produced.

10. A process as defined in claim 1 wherein at least three molecular proportions of ammonia are used per mol of olefin oxide.

11. A process as defined in claim 4 wherein isobutyronitrile is produced from isobutylene oxide.

JOHN E. MAHAN.

REFERENCES CITED

The following references are of record in the file of this patent:

UNITED STATES PATENTS

| Number | Name | Date |
|---|---|---|
| 2,006,981 | Andrussow | July 2, 1935 |
| 2,337,421 | Spence et al. | Dec. 21, 1943 |
| 2,337,422 | Spence et al. | Dec. 21, 1943 |
| 2,364,422 | Brooks | Dec. 5, 1944 |

OTHER REFERENCES

Krassousky: "Comptes Rendus" (Fr. Acad. Sci.), vol. 146, pages 236 to 239.

Certificate of Correction

Patent No. 2,500,256                          March 14, 1950

JOHN E. MAHAN

It is hereby certified that errors appear in the printed specification of the above numbered patent requiring correction as follows:

Column 3, line 74, strike out the word "an" and insert the same before "aliphatic" in line 68, same column;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*